March 14, 1933.  H. L. BARNHOLDT  1,901,280
ROTOR CONSTRUCTION
Filed March 26, 1929

INVENTOR
Harold L. Barnholdt.
BY
Wesley L. Carr
ATTORNEY

Patented Mar. 14, 1933

1,901,280

UNITED STATES PATENT OFFICE

HAROLD L. BARNHOLDT, OF PITTSBURGH, PENNSYLVANIA, ASSIGNOR TO WESTINGHOUSE ELECTRIC & MANUFACTURING COMPANY, A CORPORATION OF PENNSYLVANIA

ROTOR CONSTRUCTION

Application filed March 26, 1929. Serial No. 350,024.

My invention relates to dynamo-electric machines and more particularly to rotors of fabricated construction.

Heretofore, fabricated rotors have been constructed in such manner that at least one, and sometimes two or three, welded joints have been present between the shaft and the laminated rim, thus requiring that the torque, as well as radial stresses, be transmitted through welded joints of more or less uncertain fabrication.

Further, in the welding of joints, in order to insure that the joints are safely made, it is required that the metal be heated to very high temperatures. Oftentimes, the metal is overheated, and considerable heat is transmitted through the frame, and, as a result, the structure, upon cooling, is distorted. For this reason, the number of joints required for the assembly of a fabricated rotor should be a minimum.

It is the object of my invention to provide a fabricated rotor wherein welded joints are avoided between the shaft and the laminated rim.

It is another object of my invention to provide a strong and sturdy construction which is simple in construction, easy to assemble, and may be manufactured with a great saving in cost.

It is a further object of my invention to provide means for easily balancing a fabricated rotor member. When the rotor member has a cast spider, it is easy to cast holes or pockets in the member, so that, on the completion of the rotor member, Babbitt metal may be inserted in such holes as may be necessary to secure a proper balance. In fabricated or welded constructions, however, it has been more difficult to balance the completed rotor, about the only practical expedient heretofore available being to bolt weights to various portions of the spider, in order to secure perfect balancing.

According to my present invention, without introducing any extra parts, or materially increasing the cost of the fabricated parts, I utilize pipes for some of my cross ties, and perforate such pipes in order to form pockets for receiving Babbitt metal for balancing the completed rotor.

It is a further object of my invention to provide a construction in which the amount of welding required is reduced.

Figure 1:
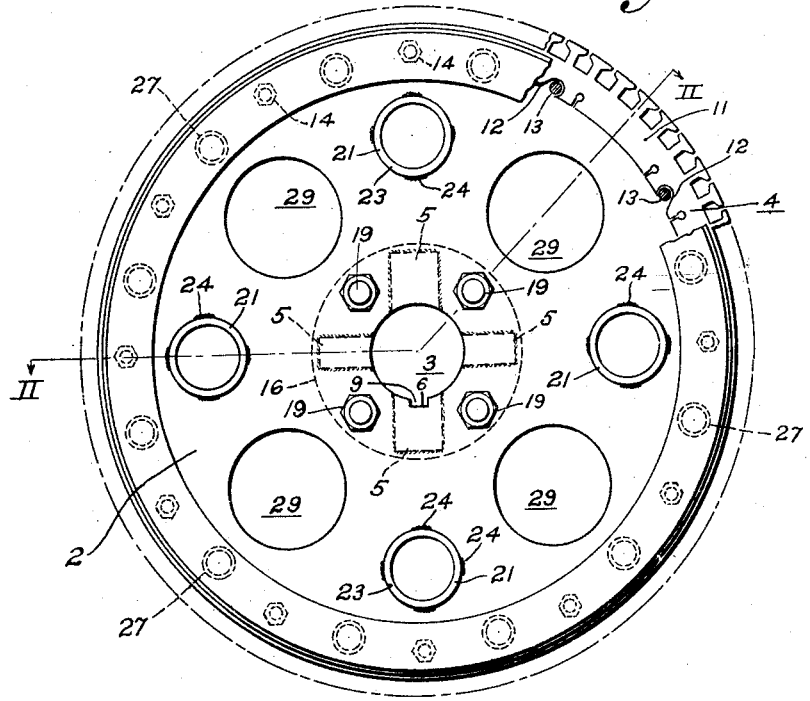
Figure 2:
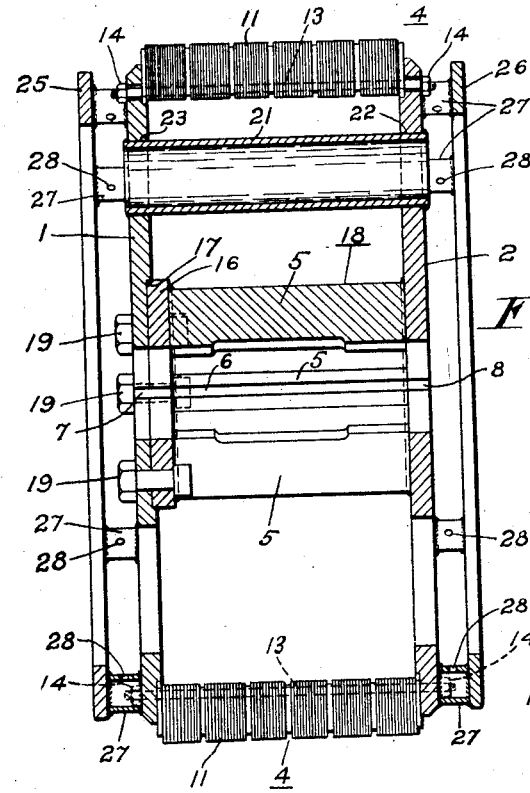

For a better understanding of my invention, reference may be had to the following description, taken in connection with the accompanying drawing, wherein Figure 1 is an end view, in elevation, of a fabricated rotor of my invention, and Figure 2 is a sectional view of my rotor, taken on the line 11—11 of Fig. 1 and looking in the direction of the arrows.

In general, my invention comprises two circular plates 1 and 2, carried by a shaft 3 and supporting, at their outer peripheries, a laminated core structure 4. In accordance with my invention, the plates contain no welded joints, as, has been used heretofore, between the shaft 3 and the laminated rim 4, and the torsional stresses are, therefore, transmitted through a solid, non-welded material.

The circular plates are held spaced in an axial direction by longitudinally spacing members or hub blocks 5, concentrically arranged with respect to, and engaging the shaft. One of said pieces has a groove or key-way 6 in alignment with similar grooves 7 and 8 in the respective plates 1 and 2. Disposed in said grooves is a key member 9 (not shown) for fastening the combined structure to the shaft. However, it is not essential that the combined structure be keyed to the shaft but may be fixed by some other means, such for example, as by pressing or shrinking.

The laminated core structure 4 comprises laminations 11 having recesses 12 for supporting the structure. The recesses 12 are of generally circular form but one side is cut away, as described in a copending application of Thomas Noden, Serial No. 286,001, filed June 16, 1928, Patent No. 1,795,882, granted March 10, 1931, assigned to Westinghouse Electric & Manufacturing Company. By virtue of the cut-away portion of the circular recesses, it is possible to assemble the individual laminations on a plurality of threaded assembly rods 13 without the necessity of sliding each lamination along the rod until it reaches its proper place as an element of the core.

The idea of assembling laminations on cylindrical rods 13, and holding the laminations in face-to-face relation by annular plates clamped against the core structure by means of tightening nuts 14 on the rods 13, is described and claimed in the copending joint application of J. L. Brown, and myself Serial No. 278,396, filed May 17, 1928 and assigned to Westinghouse Electric & Manufacturing Company. Prior to the utilization of cylindrical rods, the laminations were fastened to the frame by means of dove-tail projections which involved the expensive step of cutting dove-tail shaped grooves in the frame.

By my construction, the circular plates 1 and 2 not only serve the function of holding the core laminations in face-to-face relation but they also serve to transmit torque from the core-rim to the shaft or vice versa.

For convenience in assembling, I provide a centering plate 16 (Fig. 2), which engages a recess 17 in the inner face of the end plate 1 and is welded to corresponding ends of the longitudinal spacing members 5, on the opposite ends of which is welded the plate 2. The welding of these two plates 16 and 2 to the longitudinal spacing members 5 is about all the welding that is required in the main stress-carrying part of the structure. This provides a solid unitary structure that may be called 18.

In assembling the parts constituting the rotor, the core laminations are stacked on the assembling rods 13 which are carried by the plate 2 of the unitary structure 18. The outer ends of the rods 13 may be held in parallel and spaced circumferential relation by means of a template or by the plate 1 which may serve that purpose. As soon as the required number of laminations are assembled, the plate 1 is centered over the centering plate 16 and is clamped in place by means of tightening-bolts 19 engaging the centering plate 16. At the same time, the outer periphery of the plate 1 is clamped by the tightening-nuts 14.

In order to insure additional rigidity to the structure, pipes 21 may be disposed through aligned holes 22 and 23 in the plates 2 and 1, respectively and spot-welded thereto, as indicated at 24.

The plates 1 and 2 may carry, respectively, rings 25 and 26 spaced therefrom for supporting the end turns of the coil (not shown). The rings 25 and 26 may be spaced from the surface of their respective plates 1 and 2 by short pieces of pipe 27 having lateral holes 28 in which may be disposed Babbitt metal for balancing the rotor.

The plates 1 and 2 may also have holes 29 to lighten the structure and to facilitate the circulation of cooling air.

By the construction illustrated and described a small number of welds ensure permanency and rigidity and the joints, when welded, are all easily accessible.

I claim as my invention:

1. A fabricated rotor for a dynamo-electric machine comprising a shaft, a laminated core, two end plates disposed in spaced axial relation, a plurality of axially-disposed spacing pieces the ends of which are rigidly welded to one of said plates, means for removably attaching the other of said plates to the opposite ends of said axial spacing pieces, said plates and one of said spacing pieces being keyed to said shaft.

2. A fabricated rotor for a dynamo-electric machine comprising a shaft, a laminated core, two end plates disposed in spaced axial relation on said shaft, a plurality of axially-disposed spacing pieces, the ends of which are rigidly welded to one of said plates, a centering plate welded to the opposite ends of said spacing pieces, the other of said plates being recessed to receive said centering plate, and means for removably attaching said last mentioned plate to said centering plate and means for fastening the combined structure to said shaft.

3. A rotor for a dynamo-electric machine comprising an integral supporting structure comprising two spaced discs each having a central bore adapted to receive a shaft, one of said discs being of larger diameter than the other, and a plurality of hub blocks integrally joining said discs, a plurality of rods carried by the larger disc near the outer periphery thereof, a laminated rotor core carried by said rods, and a detachable end plate mounted on the smaller disc and having a central bore, said detachable end plate engaging the other ends of said rods, so that the core member is clamped between said larger disc and said detachable end plate.

4. A fabricated rotor comprising a plurality of hub blocks extending in radial-axial planes, two heavy end plates welded to the ends of the hub blocks, a plurality of bolts, means for detachably supporting said bolts from said end plates so that the bolts are disposed in parallel lines at equal distances from the axis of the rotor, and punchings mounted on said bolts, the structure including detachable means at at least one end of the core for clamping the same in position.

5. A fabricated rotor for a dynamo-electric machine comprising a radially extending plate and a plurality of axially parallel, laterally accessible cross-ties welded to the plate at equal distances from the axis of the rotor and characterized by the fact that they are tubular and are provided with perforations in their lateral surfaces to receive balancing material.

6. A fabricated rotor for a dynamo-electric machine comprising a radially-extending plate and a plurality of axially parallel, laterally accessible cross-ties secured to the plate at equal distances from the axis of the rotor and characterized by the fact that they are tubular and are provided with perforations in their lateral surfaces, whereby, upon the completion of the rotor member, material may be introduced into one or more of said perforations for balancing the rotor member.

7. A fabricated rotor for a dynamo-electric machine comprising a radially-extending end-plate, a ring disposed in a plane parallel to said end-plate, and a plurality of laterally accessible tubular members secured between said end-plate and said ring for spacing said members, one or more of said tubular members having perforations in their lateral surfaces to receive material for balancing the rotor.

8. A fabricated rotor for a dynamo-electric machine comprising a shaft, an annular laminated core surrounding, and spaced at all points from, said shaft, end plates in face-to-face relation to the outer laminations of said annular laminated core for supporting the same from the shaft, each of said end plates having a central perforation engaging the shaft, and tie-means disposed between said end plates and in engagement with the shaft for holding said end plates in spaced relation.

9. A fabricated rotor for a dynamo-electric machine comprising a shaft, an annular laminated core surrounding and spaced at all points from, said shaft, two thick end plates carried by said shaft and provided with annular peripheral grooves for supporting said core, each of said end plates having a central perforation engaging the shaft, means for holding said plates rigidly in spaced relation comprising longitudinally-disposed pieces disposed between said end plates and in engagement with the shaft, and means for fastening the combined structure to said shaft.

10. A fabricated rotor for a dynamo-electric machine comprising a shaft, an annular laminated core surrounding, and spaced at all points from, said shaft, two end plates disposed in spaced axial relation on said shaft, a plurality of axially disposed spacing pieces, the ends of which are rigidly welded to one of said plates, means for removably attaching the other of said plates to the opposite ends of said axial spacing pieces and means for fastening the combined structure to said shaft.

In testimony whereof, I have hereunto subscribed my name this 20th day of March 1929.

HAROLD L. BARNHOLDT.